United States Patent [19]
Zankich

[11] Patent Number: 5,556,142
[45] Date of Patent: Sep. 17, 1996

[54] ROTARY HOOK TENSION-SHEAR LATCH

[75] Inventor: Frank A. Zankich, San Pedro, Calif.

[73] Assignee: Hartwell Corporation, Placentia, Calif.

[21] Appl. No.: 421,749

[22] Filed: Apr. 13, 1995

[51] Int. Cl.⁶ .............................. E05C 19/10; E05C 5/00
[52] U.S. Cl. .................. 292/101; 292/109; 292/5
[58] Field of Search .......................... 292/101, 56, 109, 292/241, 202, 341.17, DIG. 51, DIG. 56, 5; 70/114

[56] References Cited

PUBLICATIONS

9 Sheets from The Hartwell Corporation catalog dated 1987 showing rotary latches.

Primary Examiner—Steven N. Meyers
Assistant Examiner—Donald J. Lecher
Attorney, Agent, or Firm—Harris, Wallen, MacDermott & Tinsley

[57] ABSTRACT

A latch and keeper combination for use with an aircraft panel or the like for joining one member to another member under tension and shear loading. A keeper for attaching to one member and having a bracket with an eye bolt and a bushing included therein, and a latch for attaching to another member and having a housing with cover and a hook, a lever and a shear pin included therein. The hook and lever are rotatably mounted in the housing for rotation about an axis, with the hook having an arcuate finger for engaging the keeper eye bolt, with the shear pin sliding into and out of the keeper bushing and with the lever driving the pin. The hook rotates the lever to a closed position to engage the shear pin with the bushing and to an open position to disengage the shear pin from the bushing. A plunger carried in the housing for translation along the axis, and a spring in the housing for urging the plunger outward along the axis, with plunger and hook providing for locking the hook in the closed position.

9 Claims, 3 Drawing Sheets

FIG. 3
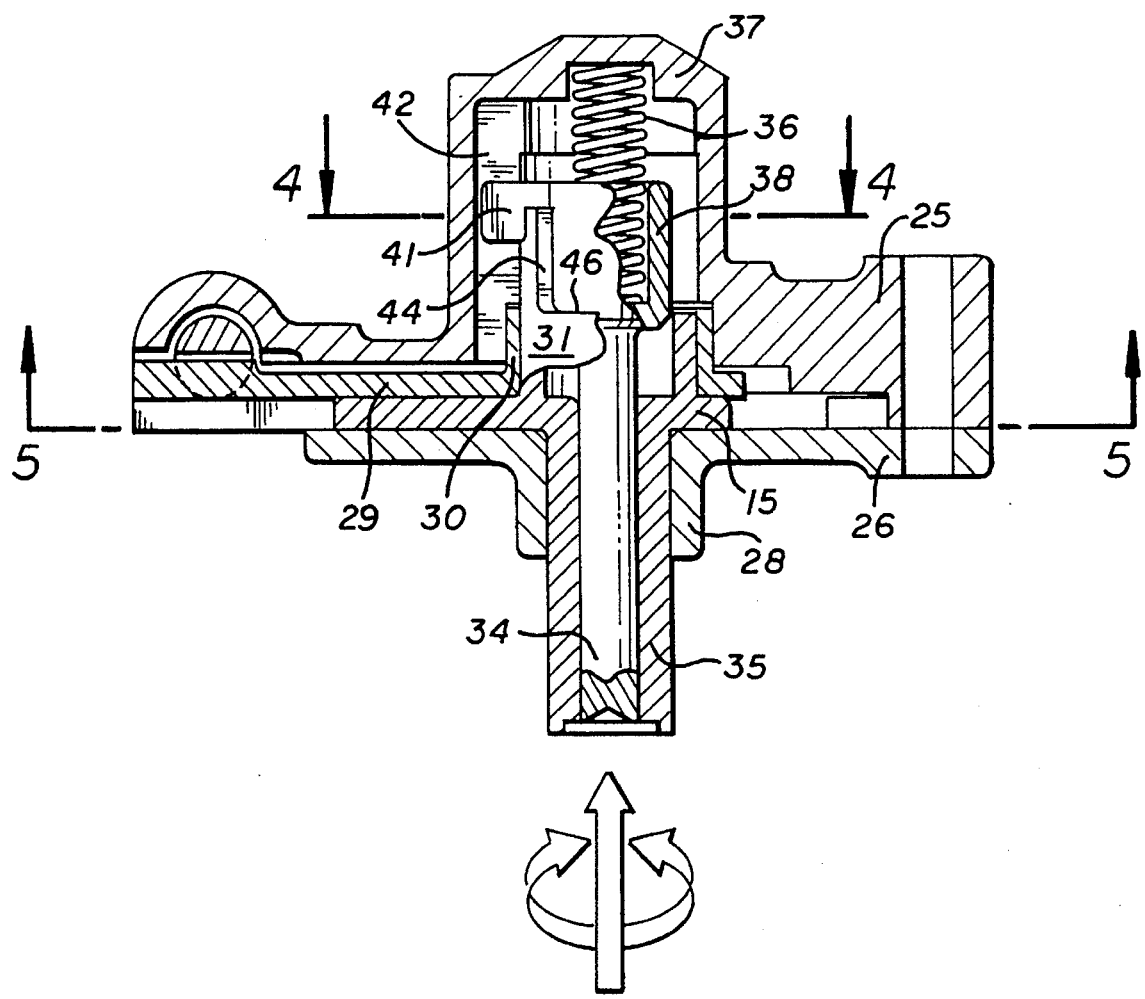
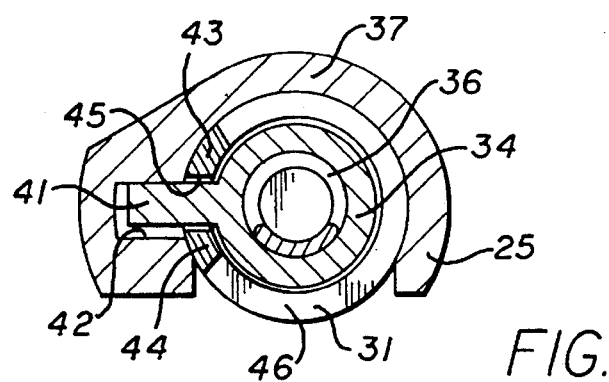
FIG. 4

ROTARY HOOK TENSION-SHEAR LATCH

BACKGROUND OF THE INVENTION

This invention relates to a latch and keeper combination such as may be used on an aircraft panel, door, or the like for holding the panel closed under both tension loading and shear loading. Tension load latching devices have been utilized in the past and shear load latching devices have been used in the past. However, the present invention provides for both the shear loading and the tension loading in a single device, and avoids shear loading at the door.

In operation, it is desirable to have such a latching device wherein the tension load component could be positive acting for both engagement and disengagement and also provide a flag or indicator to show when the device is in the open position. It is particularly desirable to have the component providing the locking feature also incorporate the flag to reduce the number of parts and also reduce the possibility of an inaccurate flag indication.

Rotary hook type latching devices have been utilized in the past, but such prior art devices have not provided any shear load capability. Also, it is desirable to incorporate separate preload adjustments in the latching device for the tension load components and for the shear load components.

It is an object of the invention to provide a new and improved latch and keeper combination which accomplishes these various aims. Other objects, advantages, features and results will more fully appear in the course of the following description.

SUMMARY OF THE INVENTION

The presently preferred embodiment of the invention includes a latch and keeper combination for joining one member to another member under both tension and shear loading. A keeper is attachable to one member and has a bracket with an eye bolt and a bushing included therein, and a latch is attachable to another member and has a housing with cover and a hook, a lever and a shear pin included therein, with the hook and lever rotatably mounted in the housing for rotation about an axis, the hook having an arcuate finger for engaging the keeper eye bolt, and with the shear pin mounted in the housing for sliding into and out of the keeper bushing. The lever and pin are engageable for driving the pin by the lever, the hook and lever are engageable for rotation of the lever by the hook to a closed position to engage the shear pin with the bushing, and for rotation of the lever by the hook to an open position to disengage the shear pin from the bushing.

The combination further includes a plunger carried in the housing for translation along the plunger axis, and a spring in the housing for urging the plunger outward along the axis, with the plunger and hook engaging to lock the hook in the closed position.

BRIEF DESCRIPTION OF THE DRAWINGS

FIG. 3 is an enlarged sectional view taken along the line 3—3 of FIG. 2;

FIG. 4 is a partial sectional view taken along the line 4—4 of FIG. 3;

DESCRIPTION OF THE PREFERRED EMBODIMENT

Figure 1:
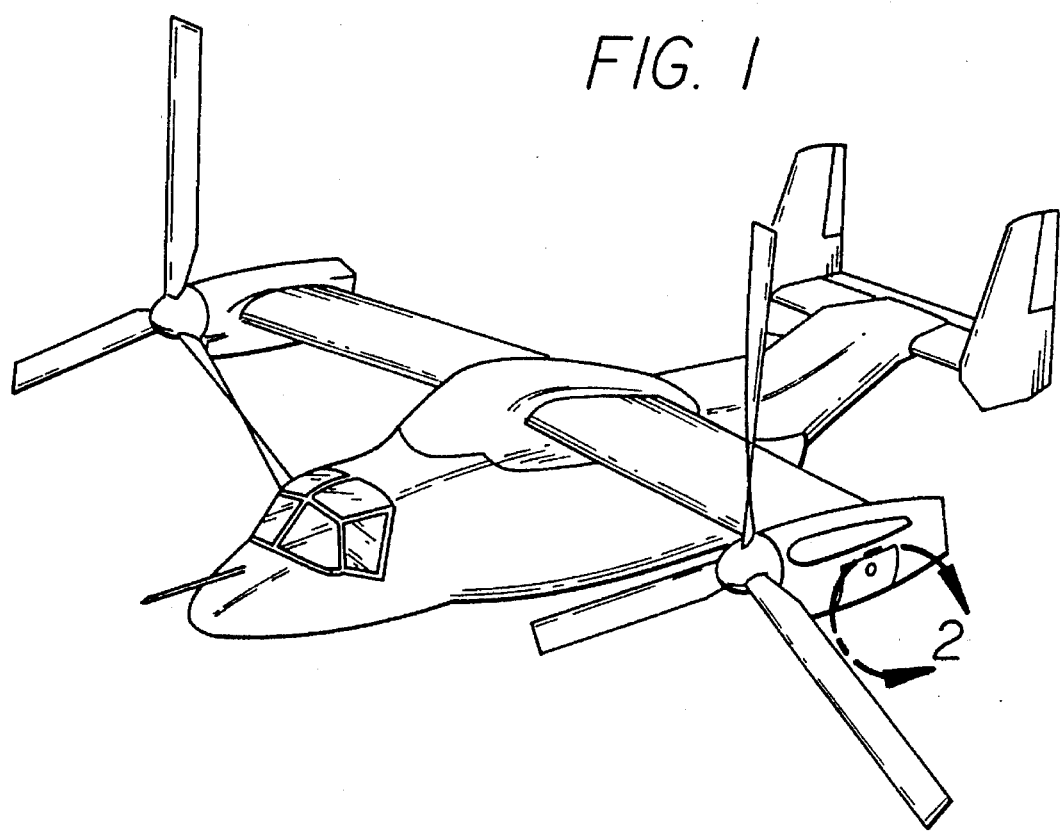
FIG. 1 is a view of an aircraft showing a typical installation for the latch and keeper combination of the present invention.
Figure 2:
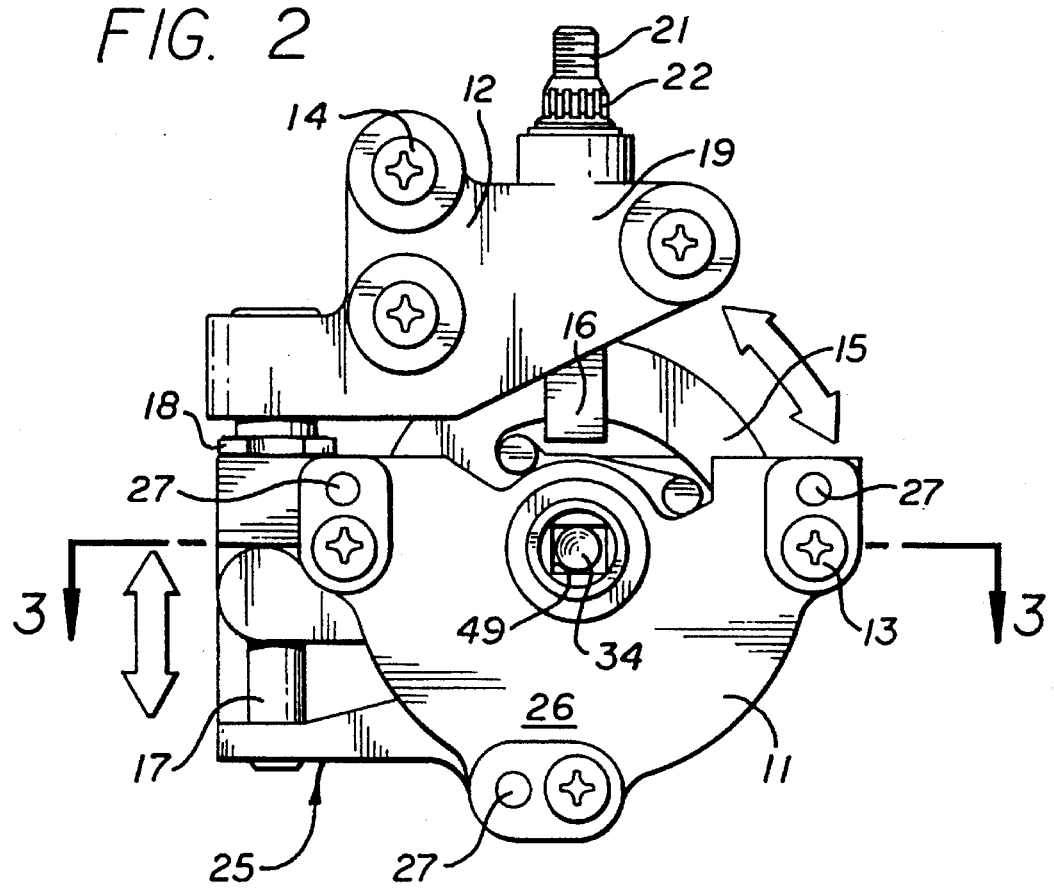
FIG. 2 is a side view of a latch and keeper combination incorporating the presently preferred embodiment of the invention.

In FIG. 2, a latch 11 of the latch and keeper combination is shown fully engaged with a keeper 12 of the combination. The latch is attached to one member by mounting screws 13, and the keeper is similarly attached to another member by screws 14. The latch and keeper and hence the two members, are maintained together by a rotating hook 15 of the latch 11 engaging an eye bolt 16 of the keeper 12 and by engagement of a shear pin 17 of the latch with a stop bushing 18 of the keeper. The bushing 18 is threadedly mounted in the bracket 19 of the keeper so that the bushing can be moved along the axis of the pin 17 to provide the desired positioning of the latch and preload of the combination. Similarly, the eye bolt 16 has a threaded outer end 21 with a nut 22 thereon for adjusting the position of the eye bolt in the bracket.

The latch 11 includes a housing 25 and a cover 26, with the housing and cover joined by rivets 27. The hook 15 is rotatably mounted in a sleeve 28 of the cover 26 of the latch. A lever 29 is rotatably mounted on the hook 15 by a sleeve 30 which rides on another sleeve 31 of the hook.

A plunger 34 slides axially in another sleeve 35 of the hook 15, with a spring 36 positioned between a closed end 37 of the housing and a cup 38 at the inner end of the plunger 34. The spring 36 functions to urge the plunger outward from the sleeve 35, that is, downward as viewed in FIG. 3.

A tab 41 carried on the cup 38 of the plunger 34 slides parallel to the axis of the plunger in a slot 42 of the housing. Spaced shoulders 43, 44 project outward from the sleeve 31 of the hook, along a line parallel to the axis of the plunger, defining a notch 45 between the shoulders. When the plunger 34 is pushed inward compressing the spring 36, the tab 41 is moved out of the notch 45 in the hook, permitting rotation of the hook. After the hook has been rotated about 45°, the pressure on the plunger may be released, permitting the plunger to move outward beyond the position shown in FIG. 3, with the outer end of the plunger projecting beyond the outer end of the sleeve 35 of the hook. Rather than resting against the bottom of the notch 45, the tab 41 now rests against the end 46 of the sleeve 31 of the hook. This provides a visual indication or flag that the latching device is no longer in the locked condition. The passage through the sleeve 35 of the hook is circular for rotation about the plunger 34. However, desirably, the outer end of the sleeve has a square internal opening 49 for driving the hook in rotation by a square tool which can be inserted into the opening 49 to push the plunger in and rotate the hook.

The lever 29 has a boss 50 and another boss 51 which project upward into the path of the hook 15. The hook has an arcuate finger 52 defining a throat 53 and also a shoulder 54. The outer end 55 of the lever 29 rides in a notch 56 in the shear pin 17.

Figure 5:
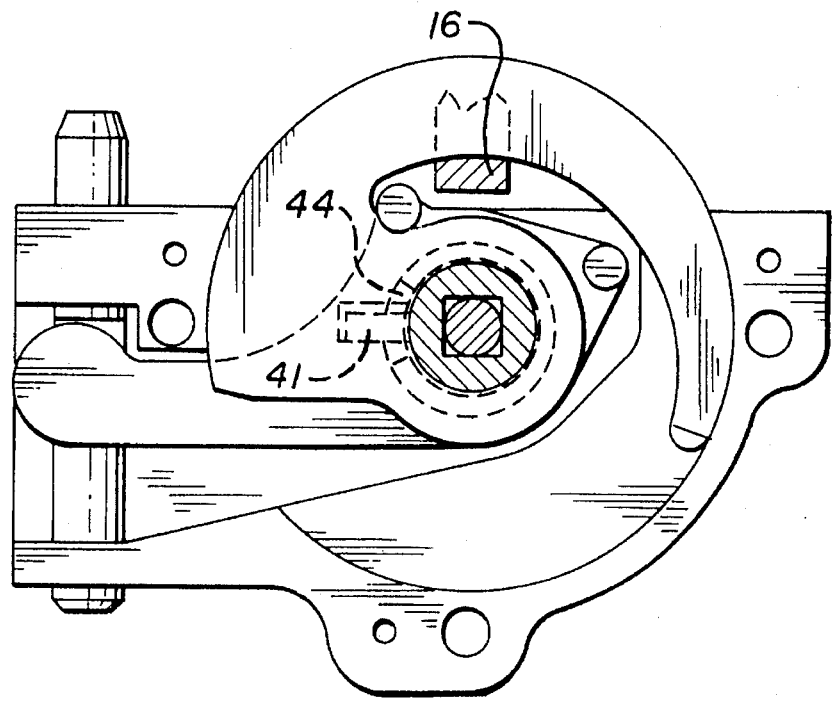
FIG. 5 is a view similar to that of FIG. 2 showing the latch with the cover removed and in the closed position.
Figure 6:
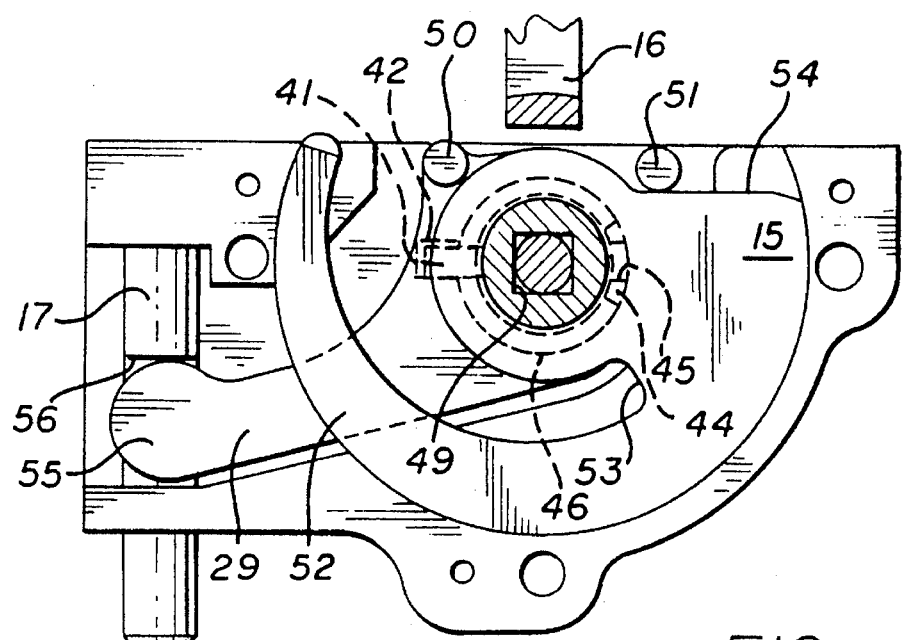
FIG. 6 is a view similar to that of FIG. 5 with the latch in the open position.

When the hook is rotated from the open position of FIG. 6 to the closed position of FIG. 5, the throat 53 of the hook engages the boss 50 of the lever to rotate the lever and move the shear pin 17 from the open position of FIGS. 6 to the closed position of FIG. 5, with the pin sliding into the bushing 18 of the keeper. At the same time, the finger 52 of the hook slides into the open eye of the eye bolt 16, as shown in FIGS. 2 and 5. When the hook is rotated counterclockwise from the position of FIG. 5 to the position of FIG. 6, the shoulder 54 of the hook engages the boss 51 of the lever and rotates the lever counterclockwise, withdrawing the shear pin from the bushing as the hook finger moves out of the eye bolt.

In operation, the two members to be joined are brought together to align the keeper and latch as shown in FIG. 2. When in the open position, the plunger tab 41 is resting on the end 46 of the hook, permitting the plunger to be pushed outward beyond the end of the hook. The latch is moved to the closed condition by inserting a tool into the square opening 49 of the hook. The tool is then rotated clockwise to rotate the hook 15 and the lever 29 from the position of FIG. 6 to the position of FIGS. 2 and 5, with the shoulder 44 of the hook moving past tab 41 of the plunger until notch 45 is in alignment with tab 41. The tool is now removed permitting the tab 41 to move into the notch 45, with the outer end of the plunger maintained within the outer end of the hook.

The latching device is opened or unlocked by reversing the process. The tool is again inserted into the open end of the hook to compress the spring, after which the tool is rotated clockwise moving the notch away from the tab, moving the finger out of the eye bolt, and sliding the shear pin out of the bushing.

Thus it is seen that with the unique combination of the present invention, a single latching device provides for both tension and shear loading, provides for adjustment for both tension and shear to achieve the desired preload, provides for locking in the closed position, and provides a flag for indicating that the device is in the open position.

The shear pin engagement and retraction are positive. The hook acts on the lever and shear pin at the extremes of rotation to engage and retract the pin. The hook and shear pin must be fully latched and engaged with the keeper for the plunger to indicate the closed position of the latch.

I claim:

1. A latch and keeper combination for joining one member to another member under tension and shear loading, including:

a keeper for attaching to one member and having a bracket with an eye bolt and a bushing included therein; and a latch for attaching to another member and having a housing with a cover and a hook, a lever and a shear pin included therein;

with said hook and lever rotatably mounted in said housing for rotation about an axis;

said hook having an arcuate finger for engaging said keeper eye bolt;

with said shear pin mounted in said housing for sliding into and out of said keeper bushing, and first means for interengaging said lever and pin for driving said pin by said lever;

said hook and lever having second interengaging means for rotation of said lever by said hook to a closed position to engage said shear pin with said bushing when said hook engages said eye bolt, and having third interengaging means for rotation of said lever by said hook to an open position to disengage said shear pin from said bushing when said hook disengages said eye bolt;

said lever having first and second projecting bosses and said hook having a throat and a shoulder, with said hook throat engaging said first boss to move said pin into said bushing, and with said hook shoulder engaging said second boss to move said pin out of said bushing.

2. A combination as defined in claim 1 including a plunger carried in said housing for translation along said axis, and a spring in said housing for urging said plunger outward along said axis, said plunger and hook having fourth interengaging means for locking said hook in said closed position.

3. A combination as defined in claim 2 wherein said fourth interengaging means includes a projecting tab on said plunger and a notch in said hook for receiving said tab when said spring is compressed.

4. A combination as defined in claim 3 wherein said plunger is of a length to project beyond said hook when in said open position, and the engagement of said tab in said notch prevents said plunger from projecting beyond said hook.

5. A latch and keeper combination for joining one member to another member under tension and shear loading, including:

a keeper for attaching to one member and having a bracket with an eye bolt and a bushing included therein; and a latch for attaching to another member and having a housing with a cover and a hook, a lever and a shear pin included therein;

with said hook and lever rotatably mounted in said housing for rotation about an axis;

said hook having an arcuate finger for engaging keeper eye bolt;

with said shear pin mounted in said housing for sliding into and out of said keeper bushing, and first means for interengaging said lever and pin for driving said pin by said lever;

said hook and lever having second interengaging means for rotation of said lever by said hook to a closed position to engage said shear pin with said bushing when said hook engages said bolt, and having third interengaging means for rotation of said lever by said hook an open position to disengage said shear pin from said bushing when said hook disengages said eye bolt;

a plunger carried in said housing for translation along said axis, and a spring in said housing for urging said plunger outward along said axis, said plunger and hook having fourth interengaging means for locking said hook in said closed position;

said fourth interengaging means including a projecting tab on said plunger and a notch in said hook for receiving said tab when said spring is compressed;

said plunger being of a length to project beyond said hook when in said open position, with the engagement of said tab in said notch preventing said plunger from projecting beyond said hook;

said lever including first and second projecting bosses and said hook having a throat and a shoulder, with said hook throat engaging said first boss to move said pin into said bushing, and with said hook shoulder engaging said second boss to move said pin out of said bushing.

6. A combination as defined in claim 5 wherein said hook includes a first sleeve projecting along said axis in a first direction, said first sleeve having angularly spaced shoulders projecting parallel to said axis and defining said notch therebetween.

7. A combination as defined in claim 6 wherein said hook includes a second sleeve projecting along said axis in a direction opposite to said first direction for slidingly receiving said plunger, and an internal axial opening for receiving a rotation drive tool which also depresses said plunger to compress said spring.

8. A combination as defined in claim 7 wherein said bushing is threadedly mounted in said keeper for translating said bushing along the axis of movement of said pin in said housing, and said eye bolt is slidably mounted in said keeper with with a threaded outer end and a nut thereon for positioning said eye bolt in said keeper, for adjusting the preload of said keeper and latch.

9. A latch and keeper combination for joining one member to another member under tension and shear loading, including:

a keeper for attaching to one member and having a bracket with an eye bolt and a bushing included therein; and a latch for attaching to another member and having a housing with a cover and a hook, a lever and a shear pin included therein;

with said hook and lever rotatably mounted in said housing for rotation about an axis;

said hook having an arcuate finger for engaging said keeper eye bolt;

with said shear pin mounted in said housing for sliding into and out of said keeper bushing, and first means for interengaging said lever and pin for driving said pin by said lever;

said hook and lever having second interengaging means for rotation of said lever by said hook to a closed position to engage said shear pin with said bushing when said hook engages said eye bolt, and having third interengaging means for rotation of said lever by said hook to an open position to disengage said shear pin from said bushing when said hook disengages said eye bolt;

a plunger carried in said housing for translation along said axis, and a spring in said housing for urging said plunger outward along said axis, said plunger and hook having fourth interengaging means for locking said hook in said closed position, said fourth interengaging means including a projecting tab on said plunger and a notch in said hook for receiving said tab when said spring is compressed, said plunger being of a length to project beyond said hook when in said open position, and with the engagement of said tab in said notch preventing said plunger from projecting beyond said hook;

said lever including first and second projecting bosses and said hook having a throat and a shoulder, with said hook throat engaging said first boss to move said pin into said bushing, and with said hook shoulder engaging said second boss to move said pin out of said bushing, said hook including a first sleeve projecting along said axis in a first direction, said first sleeve having angularly spaced shoulders projecting parallel to said axis and defining said notch therebetween, and said hook including a second sleeve projecting along said axis in a direction opposite to said first direction for slidingly receiving said plunger, and an internal axial opening for receiving a rotation drive tool which also depresses said plunger to compress said spring.

* * * * *